(12) United States Patent
Leis et al.

(10) Patent No.: US 7,325,115 B2
(45) Date of Patent: Jan. 29, 2008

(54) ENCRYPTION OF SYSTEM PAGING FILE

(75) Inventors: Benjamin A. Leis, Seattle, WA (US);
David B. Cross, Redmond, WA (US);
Duncan G. Bryce, Redmond, WA (US);
Jianrong Gu, Bellevue, WA (US);
Rajeev Y. Nagar, Sammamish, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 10/721,562

(22) Filed: Nov. 25, 2003

(65) Prior Publication Data

US 2005/0114688 A1 May 26, 2005

(51) Int. Cl.
*G06F 12/00* (2006.01)
(52) U.S. Cl. ........................ 711/164; 713/193
(58) Field of Classification Search ................ None
See application file for complete search history.

(56) References Cited

U.S. PATENT DOCUMENTS

| | | | |
|---|---|---|---|
| 5,920,895 A | 7/1999 | Perazzoli, Jr. et al. ...... 711/163 |
| 5,931,947 A | 8/1999 | Burns et al. ................. 713/201 |
| 6,249,866 B1 | 6/2001 | Brundrett et al. ........... 713/165 |
| 6,330,670 B1 | 12/2001 | England et al. ................. 713/2 |
| 6,405,315 B1 | 6/2002 | Burns et al. ................. 713/190 |
| 6,442,654 B1 | 8/2002 | Brock et al. ................. 711/141 |
| 2003/0188179 A1* | 10/2003 | Challener et al. ........... 713/193 |
| 2004/0091114 A1* | 5/2004 | Carter et al. ................. 380/259 |
| 2004/0190714 A1* | 9/2004 | Masui et al. .................. 380/43 |

* cited by examiner

*Primary Examiner*—Reginald Bragdon
*Assistant Examiner*—Ngoc Dinh
(74) *Attorney, Agent, or Firm*—Woodcock Washburn LLP

(57) ABSTRACT

An operating system copies data from memory pages into a paging file on disk, in order to free up space in the memory. A mechanism is disclosed that causes the data to be encrypted as it is copied into the paging file, thereby protecting the paged data from unauthorized (or otherwise undesired) observation. The data that is stored in the paging file is encrypted with a session key, that is generated shortly after the machine on which the paging file exists is started. The session key, which is used both for encryption and decryption of the paging file data, is stored in volatile memory, so that the key is not persisted across boots of the machine. Since the key is not persisted across boots, old paging file data that was stored prior to the most recent boot cannot be recovered in clear text, thereby protecting the data from observation.

19 Claims, 6 Drawing Sheets

ENCRYPTION OF SYSTEM PAGING FILE

FIELD OF THE INVENTION

The present invention relates generally to the file of computing, and, more particularly, to a mechanism for encrypting and decrypting a virtual memory paging file.

BACKGROUND OF THE INVENTION

Modern computer systems typically provide a virtual memory facility in order to make available memory capacity beyond the size of the physical random access memory (RAM). Virtual memory systems provide a virtual address space, which may be larger than the physical address space. In order to keep the virtual memory from overflowing the contents of the physical address space, pages are copied out of the physical memory when more space in the physical memory is needed, and into the physical memory when a program needs to access those pages. When a page is copied out of the physical memory, the contents of the page is stored on disk in a file called a "paging file."

A problem with storing images of memory pages on disk—even temporarily—is that it is difficult to protect the contents of those pages from unauthorized observation. The physical memory is generally a volatile memory that will lose its contents if power to the system is removed. Therefore, there is assurance that any secret data stored in the volatile memory cannot be recovered by an unauthorized observer if the system is turned off, crashes, or is rebooted. However, if data from the volatile has been copied to the paging file, then this data can be observed by anyone with access to the disk, and this data will still exist on disk following a power-off event, crash, or reboot. This potential presents a security risk if the data is secret, or otherwise sensitive, since an attacker could obtain this data from the disk.

In view of the foregoing, there is for a mechanism to protect a paging file that overcomes the drawbacks of the prior art.

SUMMARY OF THE INVENTION

The present invention protects a paging file by encrypting the data stored in the paging file. In accordance with the invention, the paging file is marked for encryption. The paging file is stored in a file system that has a file encryption facility. File systems that provide for file encryption are described in U.S. Pat. No. 6,249,866, which is incorporated herein by reference. When the virtual memory manager passes to the file system data to be stored in the paging file, the file system sees that paging file is marked for encryption and causes the data to be encrypted prior to storing the data in the paging file. The file system may communicate with an encryption component in order to perform the actual encryption. The encryption component receives clear text from the file system, applies an encryption key to create ciphertext, and passes ciphertext back to the file system to be stored in the paging file.

Existing file encryption systems generally encrypt the file, and also persist a copy of the key that is needed to decrypt the file. Persistent key storage makes sense in the case of ordinary files, because these files are intended for long-term storage, and it is usually necessary to be able to decrypt these files across boots of the machine. Paging files are different from ordinary files in the sense that paging files are temporary repositories for data that is meaningful only in the context of a single instantiation of a computing environment (e.g., between boots of a machine). Thus, the paging file data has little value after the system has been rebooted, and storage of this data in a usable form is a liability in the sense that it poses a security risk. Thus, persisting the key that is needed to decrypt paging file data may be disadvantageous, since doing so may allow data—including secret or sensitive data—to be decrypted in some unpredictable context (e.g., after the hard disk has been removed from its intended machine and installed on a hacker's machine). In accordance with one feature of the invention, a session key is generated once per boot, and the session key is used to encrypt and decrypt the contents of the paging file only during a single run of the system (e.g., between a startup and a shutdown). The session key is not persisted across boots of the machine.

Since it may be necessary to copy pages of physical memory to the paging file at any time after boot, the session key is preferably generated very shortly after the machine is booted in order to ensure that the key is ready to service any request to write the paging file. Preferably, the component that generates the key reserves a block of physical memory very shortly after startup. This reserved memory may be used as a workspace for the encryption component to encrypt data destined for the page file, and/or as a buffer to pass data between the file system and the encryption component.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

A virtual memory manager provides a virtual address space that may be larger than the physical volatile memory of a machine. The virtual memory manager performs this task by copying data into an out of the volatile memory as needed. When data is copied out of the volatile memory, the data is stored on disk in a paging file. The present invention provides a mechanism whereby data stored in the paging file may be protected from unauthorized observation, by storing the paging file data in an encrypted form.

Example Computing Arrangement

Figure 1:
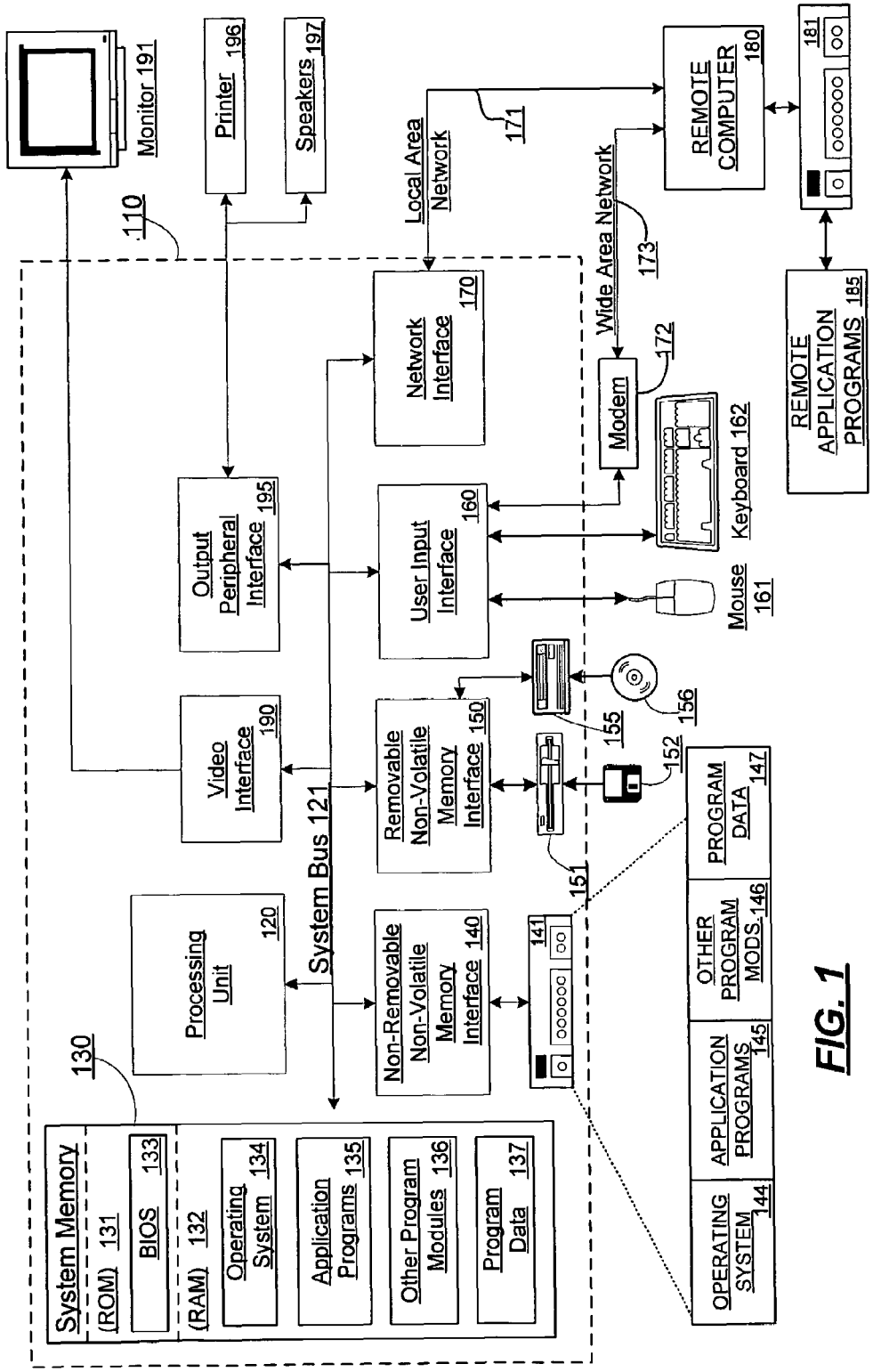
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Storage of Memory Pages in a Paging File

Figure 2:
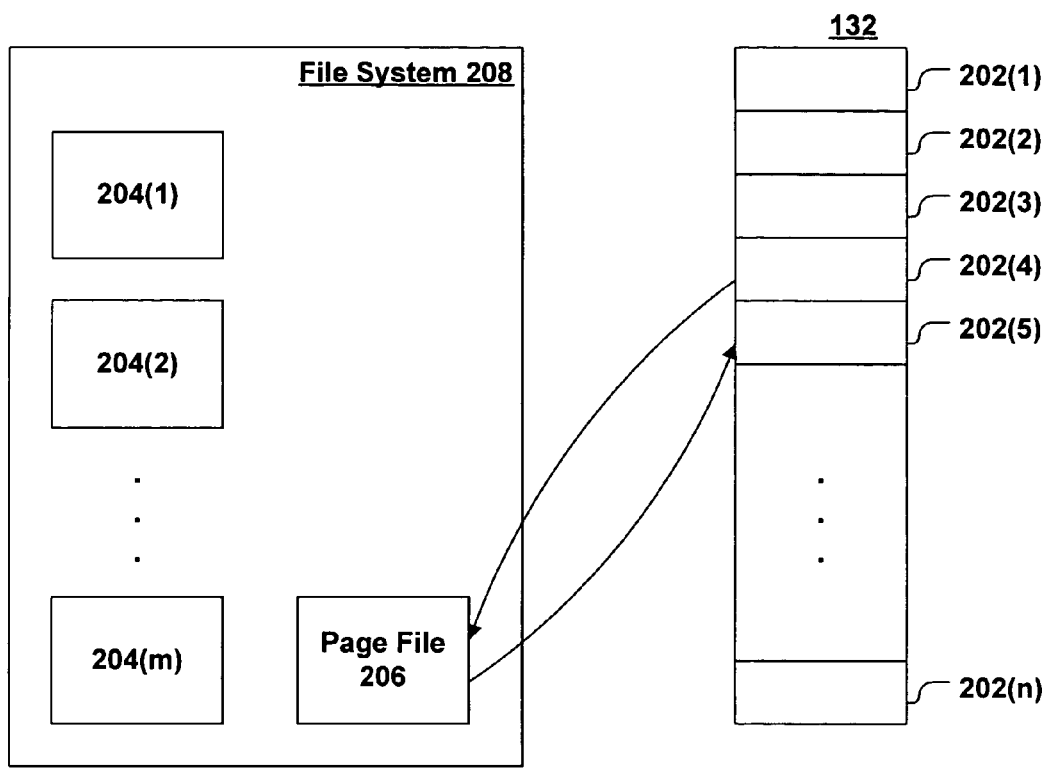
FIG. 2 is a block diagram of a computer memory and its relationship to a file system.

FIG. 2 shows a computer memory, and a file system in which pages of memory may be stored. A computer system includes a memory, such as RAM 132. RAM 132 is comprised of bytes of memory that may be organized into pages. Each page is a contiguous block of memory of a defined size—e.g., a typical system may support page sizes of 4 kilobytes, or 4 megabytes, or both sizes simultaneously. In the example of FIG. 2, RAM 132 contains pages 202(1), 202(2), 202(3), 202(4), 202(5), . . . , 202(n).

File system 208 stores data on disk in the form of files, and also contains the software and/or hardware needed to organize the files (e.g., by maintaining directories of the files), perform storage and retrieval of the files, and perform other tasks related to the maintenance of files. In the example of FIG. 2, file system 208 stores files 204(1), 204(2), . . . , 204(m). Additionally, file system 208 may store one or more paging files, such as paging file 206. Paging file 206 is a file that is used to store copies of pages from disk. Any program may maintain a paging file, although it is most typical for the operating system (e.g., operating system 134, shown in FIG. 1) to maintain a paging file for all applications and processes to share. In this example, paging file 206 is the paging file maintained by operating system 134. The MICROSOFT WINDOWS operating systems are examples of operating systems that maintain such a paging file. Operating system 134 copies pages of memory into paging file 206, when necessary to free up memory space. For example, operating system 134 may decide to free up space in RAM 132 by copying the contents of page 202(4) into paging file 206, and then reallocating the physical memory of page 202(4) for the storage of other data. Conversely, when operating system 134 receives a request to access data that is not stored in RAM 132 because the data is located on a page that was previously copied to paging file 206 (e.g., when a page fault exception is generated based on an attempt to access a page marked "not present" in the virtual address translation tables), operating system 134 copies the contents of the sought page out of paging file 206 and places it into a physical page frame of RAM 132 (and also adjusts the address translation tables to point to the new page's location).

Figure 3:
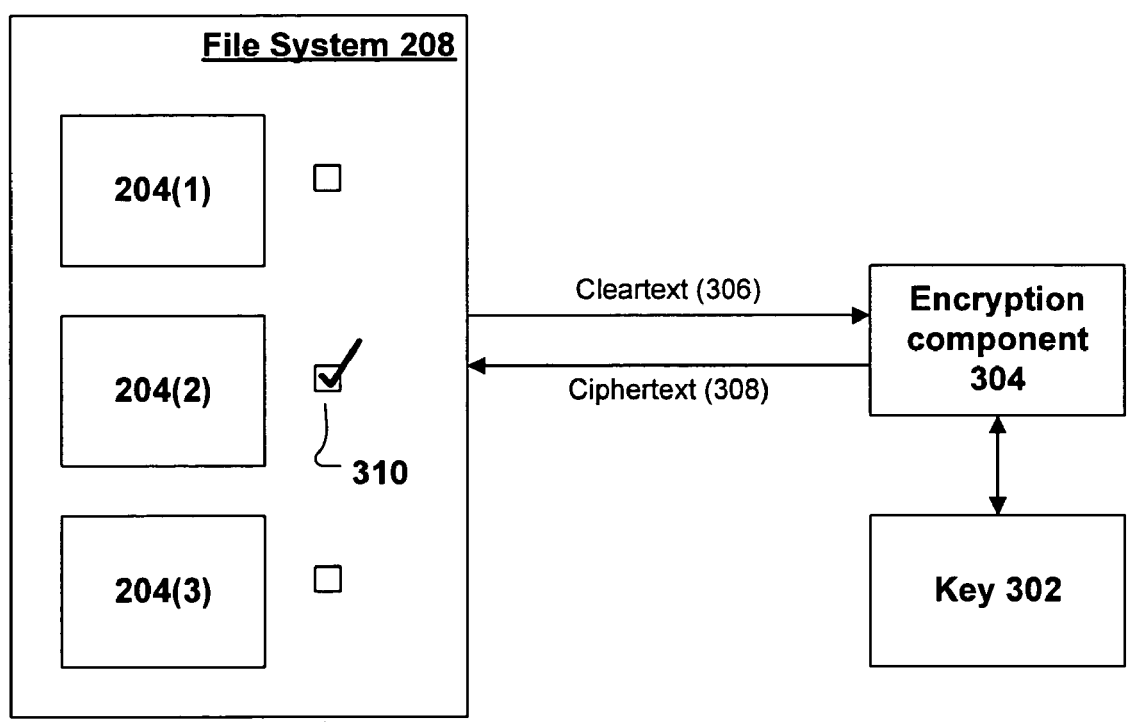
FIG. 3 is a block diagram of a mechanism that encrypts files.

One feature that may be provided by file system 208 is a file encryption component, as shown in FIG. 3. File system 208 stores a plurality of files (e.g., files 204(1), 204(2), 204(3)), as previously shown and discussed in connection with FIG. 2. Encryption component 304 exposes functionality that encrypts and decrypts files using a key 302. Preferably, file system 208 can store any file in either encrypted or clear form. In this case, each file stored in file system 208 is associated with a flag that can be either set or unset, according to whether the file is to be maintained in an encrypted form. In the example of FIG. 3, flag 310 (associated with file 204(2)) is set, indicating that file 204(2) is encrypted.

Encryption component 304 exposes functionality to encrypt and decrypt files. Thus, when file system 208 receives a request to store data in file 204(2) (or any other file whose flag is marked for encryption), file system 208 calls encryption component 304, and passes to encryption component 304 the cleartext 306 that is to be stored. Encryption component 304 then uses key 302 to encrypt cleartext 306, and passes back ciphertext 308 to file system 208. The ciphertext is then stored in file 204(2). If file system 208 receives a request to retrieve information from file 204(2), file system 208 will see at that time that file 204(2) is marked for encryption, and will pass the encrypted ciphertext from that file to encryption component 304. Encryption component 304 will then decrypt the ciphertext using key 302 and return cleartext; file system 208 will then pass the cleartext back to the requestor. In a preferred embodiment, encryption component 304 performs encryption and decryption using a symmetric key algorithm such as Data Encryption Standard (DES), Triple-DES (3DES), or Advanced Encryption Standard (AES).

In a preferred embodiment, encryption component 304 includes the functionality to generate key 302, and encryption component 304 provides key 302 to the software that manages file system 208. As described below in connection with FIG. 4, key 302 is generated very shortly after system startup and is not persisted in non-volatile storage.

Preferably, the system may have a local or centrally configured security policy that determines whether the paging file should be created with the encryption flag set or unset. For example, there may be a registry entry that indicates whether encryption of the paging file is to be performed. Upon startup—when the system creates the paging file for a given session—the system may examine the registry to determine whether or not to set the encryption flag for the paging file.

Preparation of System for Paging File Encryption

Figure 4:
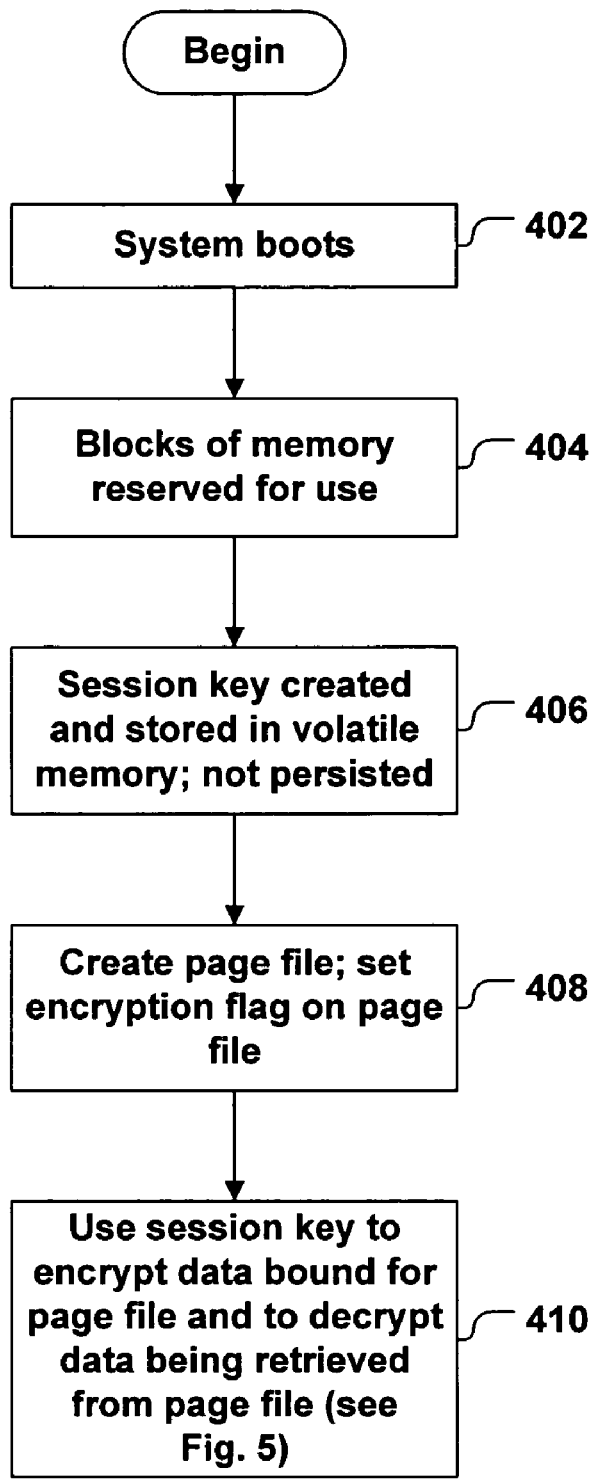
FIG. 4 is a flow diagram of a process that prepares a system for paging file encryption.

FIG. 4 is a flow diagram of a process by which a system is prepared for paging file encryption. Initially, the system in which the encrypted paging file will be used is booted (402). Following the boot, blocks of memory are reserved for certain uses (404). In particular, the reserved blocks of memory may have the following uses: First, some of the reserved memory may be used as a buffer through which data may be written back and forth between the file system and the encryption component. (If an attempt is made to write data between the file system and encryption component, and the reserved memory is insufficient, then either the write can be split into multiple stages, or else an attempt can be made to allocate more memory.) Second, some of the reserved memory may be used as a workspace for the encryption component.

Next, the session key that will be used to encrypt the paging file is created, and stored in volatile memory that may not be paged to disk, etc (406). The session key is preferably not stored in a manner that would persist the key across boots; thus, encrypted paging file data that was generated in one boot cannot be decrypted beyond the current session, thereby protecting the security of that data. (For example, if the hard disk is removed from the computer and stolen, the disk should not contain a copy of the session key that would allow the paging file data to be decrypted when the disk is installed on another machine.) Preferably, the session key is stored in non-paged memory so that it does not end up being paged to disk. (Paging the key to disk not only could create security issues, but can also result in deadlock since the key would be needed to decrypt the paging file in which the key would be stored.) It should be noted that, while FIG. 4 shows the session key being created after the blocks of memory are reserved, this sequence is not required by the invention.

A paging file is then created with the encryption flag on the file set (408). At this point, the system has been prepared for paging file encryption. As the memory manager moves data back and forth between memory and the paging file, the data is encrypted/decrypted with the session key (410). The process of moving data between a memory and an encrypted paging file is more particularly described in connection with FIG. 5

Figure 5:
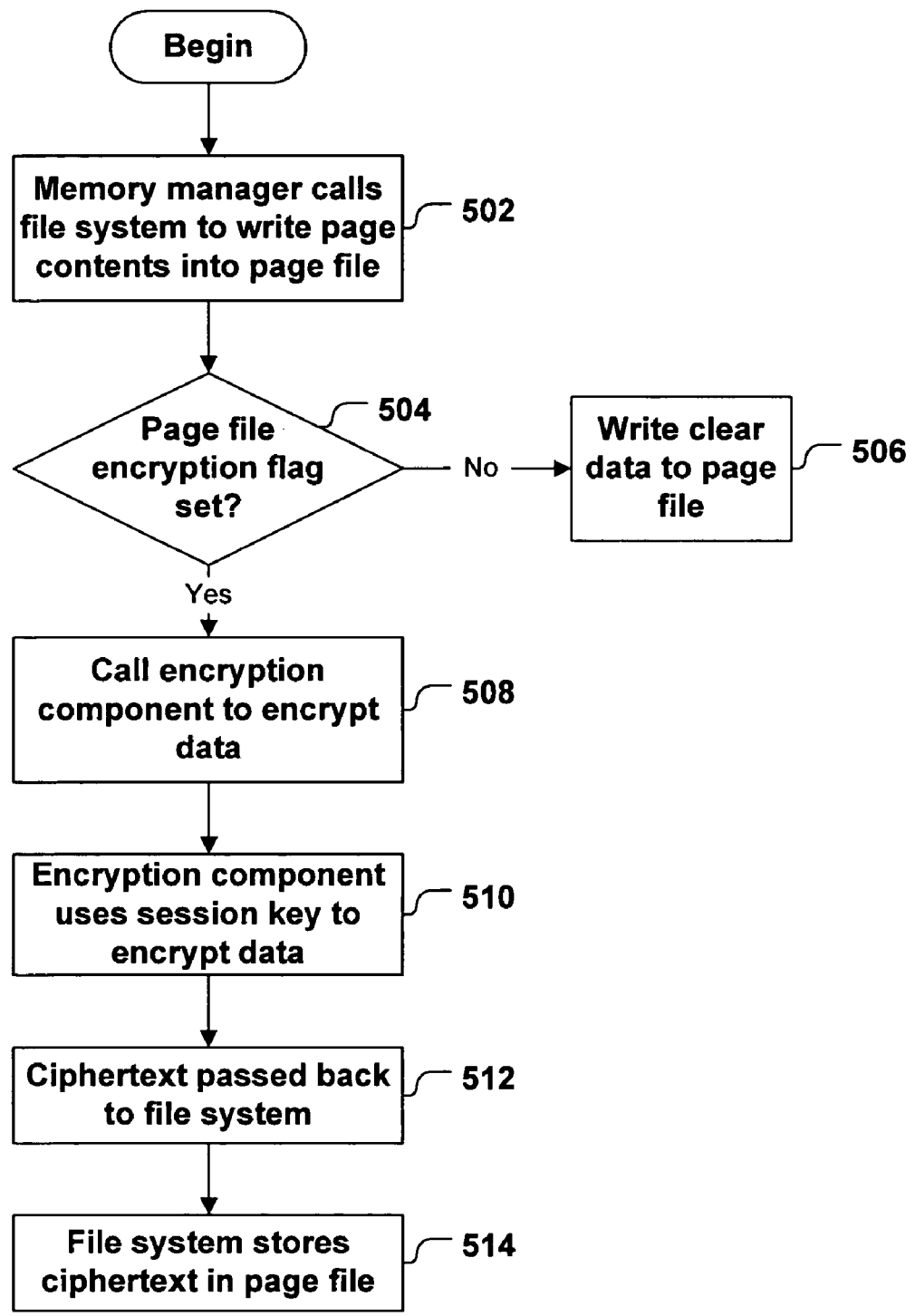
FIG. 5 is a flow diagram of a process for encrypting memory data to be stored in a paging file.

FIG. 5 shows a process by which encrypted data is stored in a paging file. At some point during the operation of a system, the memory manager determines that data stored in memory needs to be moved to disk (e.g., to free up space in the memory). The memory manager then passes the contents of a memory page to the file system with an instruction to write that contents to the paging file (502). The file system then checks whether the encryption flag on the paging file is set (504). If the encryption flag is not set, then the data provided by the memory manager is written to the paging file as cleartext (506).

If the encryption flag is set for the paging file, then the file system calls the encryption component to encrypt the data (508). The encryption component then encrypts the data using the session key (510), in order to generate ciphertext. The ciphertext is then passed back to the file system (512), and the file system stores the ciphertext in the paging file (514). It should be noted that the applicable symmetric encryption algorithm (e.g., DES, 3DES, AES, etc.) is typically a block cipher that encrypts data in defined-sized blocks; thus, the ciphertext that is generated (and written to the paging file) is at least the size of the blocks used by the encryption algorithm.

Figure 6:
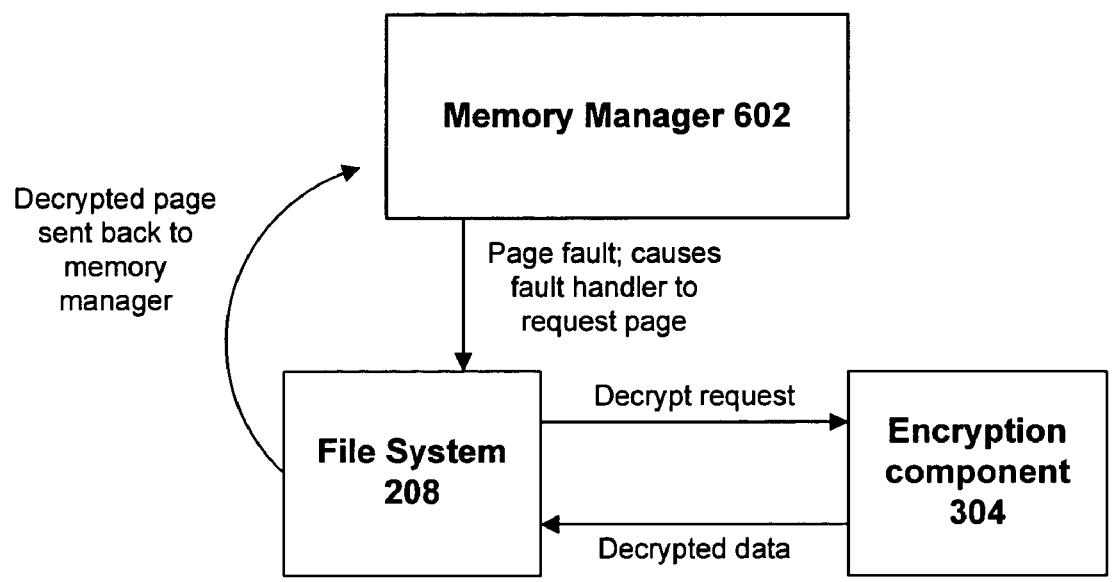
FIG. 6 is a block diagram of a memory manager, which retrieves a page from an encrypted paging file.

The process of retrieving data from an encrypted paging file is analogous to the storage process described in FIG. 5: When a request to retrieve data from the paging file comes in from the memory manager, if the paging file is marked for encryption, then the file system provides the ciphertext stored in the paging file to the encryption component, which decrypts the ciphertext with the session key and returns cleartext. An example system in which this process is performed is shown in FIG. 6. A request to access a particular page of memory is received, and the memory manager determines (based on the page map) that the requested page is not present in memory. The non-presence of the page causes a page fault to be generated. The fault handler makes a file access request in order to retrieve the requested page from the paging file. The file system 208 receives this access request, and sees that the paging file is marked for encryption. Thus, file system 208 calls upon encryption component 304 to decrypt the requested page with the session key. Encryption component 304 then passes the decrypted page back to the file system, which returns the decrypted page to memory manager 602. Memory manager 602 then writes the contents of the retrieved page into a physical memory page frame, and adjusts the page map to reflect the page's presence (and new location) in the physical memory. Preferably, the process of encrypting and decrypting paging file data is transparent to the memory manager, which can make requests to store and retrieve data without regard to whether that data will be encrypted.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of protecting a virtual memory comprising:
   storing data in a plurality of pages of a volatile memory;
   determining to move contents of a first one of said plurality of pages from said volatile memory to a paging file stored on a disk;
   providing said contents to a file system with instructions to store said contents in a paging file, said paging file being marked for encryption, said file system causing said contents to be encrypted with a key prior to storing said contents in said paging file, said key being required to decrypt information contained in said paging file, said key being stored in a manner such that a reboot of a machine on which said key is stored causes said key to be lost; and
   prior to generation of said key, reserving a block of said volatile memory for use as a workspace, whereby use of the workspace avoids the need to copy volatile memory contents to disk prior to generation of the session key.

2. The method of claim 1, further comprising:
   generating said key upon a boot of said machine.

3. The method of claim 1, wherein the file system causes said contents to be encrypted by communicating with an encryption component, the encryption component encrypting files that have been marked by the file system for encryption.

4. The method of claim 1, wherein encryption of said contents is performed according to one or more of the following algorithms:
Data Encryption Standard (DES);
Triple-DES (3DES); or
Advanced Encryption Standard (AES).

5. A method of protecting a virtual memory comprising:
storing data in a plurality of pages of a volatile memory;
determining to move contents of a first one of said plurality of pages from said volatile memory to a paging file stored on a disk;
providing said contents to a file system with instructions to store said contents in a paging file, said paging file being marked for encryption, said file system causing said contents to be encrypted with a key prior to storing said contents in said paging file, said key being required to decrypt information contained in said paging file, said key being stored in a manner such that a reboot of a machine on which said key is stored causes said key to be lost, wherein the file system causes said contents to be encrypted by communicating with an encryption component, the encryption component encrypting files that have been marked by the file system for encryption; and
reserving a block of said volatile memory in which data may be passed back and forth between the file system and the encryption component.

6. The method of claim 5, further comprising:
generating said key upon a boot of said machine.

7. The method of claim 5, wherein encryption of said contents is performed according to one or more of the following algorithms:
Data Encryption Standard (DES);
Triple-DES (3DES); or
Advanced Encryption Standard (AES).

8. A system for maintaining an encrypted paging file that stores virtual memory data for a computer, the system comprising:
an encryption component that receives data and performs encryption and decryption operations on said data using a key;
a mechanism that generates said key;
a storage location in the computer that stores said key in a manner that causes said key not to persist across boots of the computer; and
a virtual memory manager that copies or moves data from volatile memory to disk by requesting that a file system store the copied or moved data in a paging file, the file system calling upon the encryption component to encrypt the copied or moved data with said key,
wherein the encryption component reserves a block of memory upon startup.

9. The system of claim 8, wherein the block of memory is used as a workspace for the encryption component prior to generation of said key, whereby sufficient space for storage of said encryption component's operating data exists in said volatile memory prior to generation of said key.

10. The system of claim 8, wherein the block of memory is used as a buffer to pass information between the file system and the encryption component.

11. The system of claim 8, wherein said key is generated before said virtual memory manager directs the storage of data into the paging file.

12. The system of claim 8, wherein said key is stored in said volatile memory, and wherein no copy of said key is stored in any non-volatile memory or storage device of the computer.

13. The system of claim 8, wherein the encryption component encrypts encryption the data according to one or more of the following algorithms:
Data Encryption Standard (DES);
Triple-DES 3(DES); or
Advanced Encryption Standard (AES).

14. A computer-readable storage medium encoded with computer executable instructions to perform a method that takes place upon startup of a computer, the method comprising:
generating a session key;
storing said session key in a non-persistent manner that does not survive across machine boots;
retrieving information indicating that virtual memory data stored on disk is to be encrypted;
marking a paging file as an encrypted file;
receiving, from a memory manager, data from a volatile storage device that is to be stored on disk in the paging file;
protecting the received data from observation by encrypting the received data with a session key prior to storing said data in the paging file;
reserving a block of memory prior to generation of the session key, wherein the block of memory is used either as:
a buffer to pass data between a file system that maintains the paging file and an encryption component that performs encryption and decryption of the data with the session key; and
a workspace usable by the encryption component prior to generation of the session key.

15. The computer-readable storage medium of claim 14, wherein the session key is stored in the volatile storage device, and no copy of the session key is stored on disk.

16. The computer-readable storage medium of claim 14, wherein said encryption component performs encryption according to one or more of the following algorithms:
Data Encryption Standard (DES);
Triple-DES 3(DES); or
Advanced Encryption Standard (AES).

17. A computer-readable storage medium comprising executable instructions to perform a method of protecting a virtual memory, the method comprising:
storing data in a plurality of pages of a volatile memory;
determining to move contents of a first one of said plurality of pages from said volatile memory to a paging file stored on a disk;
providing said contents to a file system with instructions to store said contents in a paging file, said paging file being marked for encryption, said file system causing said contents to be encrypted with a key prior to storing said contents in said paging file, said key being required to decrypt information contained in said paging file, said key being stored in a manner such that a reboot of a machine on which said key is stored causes said key to be lost, wherein the file system causes said contents to be encrypted by communicating with an encryption component, the encryption component encrypting files that have been marked by the file system for encryption; and reserving a block of said volatile memory in which data may be passed back and forth between the file system and the encryption component.

18. The computer-readable storage medium of claim 17, wherein the method further comprises:

generating said key upon a boot of said machine.
Triple-DES (3DES); or
Advanced Encryption Standard (AES).

19. The computer-readable storage medium of claim 17, wherein encryption of said contents is performed according to one or more of the following algorithms:

Data Encryption Standard;
Data Encryption Standard (DES);
Triple-DES 3(DES); or
Advanced Encryption Standard (AES).

* * * * *

UNITED STATES PATENT AND TRADEMARK OFFICE
CERTIFICATE OF CORRECTION

Page 1 of 1

PATENT NO. : 7,325,115 B2
APPLICATION NO. : 10/721562
DATED : January 29, 2008
INVENTOR(S) : Benjamin A. Leis et al.

It is certified that error appears in the above-identified patent and that said Letters Patent is hereby corrected as shown below:

In column 7, line 44, after "FIG. 5" insert -- . --.

In column 10, line 12, in Claim 13, delete "3(DES);" and insert -- (3DES); --, therefor.

In column 10, line 47, in Claim 16, delete "3(DES);" and insert -- (3DES); --, therefor.

In column 11, line 9-10, in Claim 18, after "said machine." delete "Triple-DES (3DES); or Advanced Encryption Standard (AES).".

In column 12, line 4, in Claim 19, after "following algorithms:" delete "Data Encryption Standard;".

In column 12, line 5, in Claim 19, delete "3(DES);" and insert -- (3DES); --, therefor.

Signed and Sealed this
Twenty-second Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,325,115 B2 | Page 1 of 1 |
| APPLICATION NO. | : 10/721562 | |
| DATED | : January 29, 2008 | |
| INVENTOR(S) | : Leis et al. | |

It is certified that error appears in the above-identified patent and that said Letters Patent is hereby corrected as shown below:

In the Claims

COL. 8, line 65 [Claim 1, last line], delete the word "session"

Signed and Sealed this
Twenty-sixth Day of November, 2013

Margaret A. Focarino
*Commissioner for Patents of the United States Patent and Trademark Office*